(12) United States Patent
Leonczyk et al.

(10) Patent No.: US 9,416,777 B2
(45) Date of Patent: Aug. 16, 2016

(54) CONTROL CIRCUITS FOR ELECTROCHEMICAL PUMP WITH E-VALVES

(71) Applicant: Becton, Dickinson and Company, Franklin Lakes, NJ (US)

(72) Inventors: Andrew Leonczyk, Warwick, RI (US); David Durfee, Scituate, RI (US); Roland Croteau, Acushnet, MA (US); Prestor Saillant, Coventry, RI (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 144 days.

(21) Appl. No.: 14/499,072

(22) Filed: Sep. 26, 2014

(65) Prior Publication Data

US 2016/0090971 A1    Mar. 31, 2016

(51) Int. Cl.

| F04B 17/00 | (2006.01) |
|---|---|
| F03G 7/00 | (2006.01) |
| F04B 7/00 | (2006.01) |
| F04B 17/03 | (2006.01) |
| F04B 39/08 | (2006.01) |
| F01L 9/04 | (2006.01) |
| F04B 43/04 | (2006.01) |
| F04B 53/10 | (2006.01) |
| H01F 7/06 | (2006.01) |
| H02N 11/00 | (2006.01) |

(52) U.S. Cl.
CPC . *F04B 17/00* (2013.01); *F01L 9/04* (2013.01); *F03G 7/005* (2013.01); *F04B 7/0076* (2013.01); *F04B 17/03* (2013.01); *F04B 39/08* (2013.01); *F04B 43/04* (2013.01); *F04B 53/10* (2013.01); *H01F 7/06* (2013.01); *H02N 11/006* (2013.01)

(58) Field of Classification Search
USPC ........... 318/3, 17, 560, 34, 35, 37, 38, 39, 47, 318/98, 114, 115, 119, 135, 139, 700, 318/400.01, 400.02, 400.14, 400.15, 701, 318/721, 799, 800, 801, 430, 432, 400.26, 318/400.27, 400.28, 400.29; 417/5, 15, 16, 417/19, 20, 23, 26, 30, 43, 44.4, 52, 56, 417/116, 137, 190, 202, 204, 217, 237, 279, 417/280, 323, 298, 390, 416
See application file for complete search history.

(56) References Cited

U.S. PATENT DOCUMENTS

| 6,719,535 B2 | 4/2004 | Rakestraw |
|---|---|---|
| 6,802,331 B2 | 10/2004 | Arnold |
| 6,962,658 B2 | 11/2005 | Neyer |

(Continued)

FOREIGN PATENT DOCUMENTS

| AU | 2003277420 C1 | 3/2010 |
|---|---|---|
| CA | 2502671 C | 8/2011 |

(Continued)

*Primary Examiner* — Antony M Paul
(74) *Attorney, Agent, or Firm* — Dickinson Wright PLLC

(57) ABSTRACT

An electrochemical actuator drive system and method that provides for full control of an electrochemical pump system having at least three electrochemical actuators, including two valve actuators, and one pump actuator. The driving circuit is based on a standard H-bridge driving circuit wherein part of the circuit is shared among actuators. Because the system only needs to operate either the pump actuator or one of the valve actuators at any given time, part of the H-bridge driving circuit can be shared among the three actuators, thereby permitting the use of four half-bridge driving circuits.

25 Claims, 4 Drawing Sheets

(56) References Cited

U.S. PATENT DOCUMENTS

| | | |
|---|---|---|
| 6,963,062 B2 | 11/2005 | Cyr |
| 7,050,660 B2 | 5/2006 | Cyr |
| 7,060,170 B2 | 6/2006 | Paul |
| 7,175,810 B2 | 2/2007 | Arnold |
| 7,220,592 B2 | 5/2007 | Rakestraw |
| 7,235,164 B2 | 6/2007 | Anex |
| 7,258,777 B2 | 8/2007 | Paul |
| 7,267,753 B2 | 9/2007 | Anex |
| 7,296,592 B2 | 11/2007 | Rehm |
| 7,336,860 B2 | 2/2008 | Cyr |
| 7,364,647 B2 | 4/2008 | Paul |
| 7,399,398 B2 | 7/2008 | Rakestraw |
| 7,429,317 B2 | 9/2008 | Paul |
| 7,465,382 B2 | 12/2008 | Paul |
| 7,517,440 B2 | 4/2009 | Anex |
| 7,521,140 B2 | 4/2009 | Arnold |
| 7,559,356 B2 | 7/2009 | Paul |
| 7,575,722 B2 | 8/2009 | Arnold |
| 7,597,790 B2 | 10/2009 | Neyer |
| 7,632,406 B2 | 12/2009 | Wilson |
| 7,645,388 B2 | 1/2010 | Neyer |
| 7,695,603 B2 | 4/2010 | Paul |
| 7,718,047 B2 | 5/2010 | Koval |
| 7,802,923 B2 | 9/2010 | Arnold |
| 7,867,592 B2 | 1/2011 | Nelson |
| 7,867,694 B2 | 1/2011 | Rehm |
| 7,875,159 B2 | 1/2011 | Anex |
| 7,897,330 B2 | 3/2011 | Patel |
| 7,925,125 B2 | 4/2011 | Cyr |
| 7,927,477 B2 | 4/2011 | Paul |
| 7,933,012 B2 | 4/2011 | Hartmann |
| 8,021,130 B2 | 9/2011 | Votaw |
| 8,152,477 B2 | 4/2012 | Anex |
| 8,187,441 B2 | 5/2012 | Evans |
| 2005/0279299 A1 | 12/2005 | Degner et al. |
| 2007/0148014 A1 | 6/2007 | Anex |
| 2007/0267292 A1 | 11/2007 | Paul |
| 2009/0148308 A1 | 6/2009 | Saleki |
| 2009/0185916 A1 | 7/2009 | Anex |
| 2010/0012497 A1 | 1/2010 | Neyer |
| 2010/0219067 A1 | 9/2010 | Koval |
| 2011/0031268 A1 | 2/2011 | Anex |
| 2011/0114492 A1 | 5/2011 | Anex |
| 2011/0186157 A1 | 8/2011 | Paul |
| 2015/0047501 A1* | 2/2015 | Vines .............. F04B 53/06 95/19 |

FOREIGN PATENT DOCUMENTS

| | | |
|---|---|---|
| CN | 101365885 B | 8/2011 |
| DE | 102012003698 A1 | 8/2013 |
| EP | 1556612 B1 | 12/2008 |
| JP | 2006503537 A | 1/2006 |
| JP | 2008504794 A | 2/2008 |
| WO | 2004036041 A2 | 4/2004 |
| WO | 2005113419 A2 | 12/2005 |
| WO | 2005113419 A3 | 12/2005 |
| WO | 2007062068 A2 | 5/2007 |
| WO | 2007062068 A3 | 5/2007 |
| WO | 2007062182 A2 | 5/2007 |
| WO | 2007062182 A3 | 5/2007 |
| WO | 2008094999 A1 | 8/2008 |

\* cited by examiner

| INTAKE_H | INTAKE_L | PUMP_H | PUMP_L | OUTLET_H | OUTLET_L | COMMON_H | COMMON_L | STATE |
|---|---|---|---|---|---|---|---|---|
| L | L | L | L | L | L | L | L | IDLE |
| H | L | L | L | L | L | L | H | OPEN INTAKE VALVE |
| L | H | L | L | L | L | H | L | CLOSE INTAKE VALVE |
| L | L | H | L | L | L | L | H | PUMP INTAKE |
| L | L | L | H | L | L | H | L | PUMP OUTPUT |
| L | L | L | L | H | L | L | H | OPEN OUTLET VALVE |
| L | L | L | L | L | H | H | L | CLOSE OUTLET VALVE |
| ALL OTHER COMBINATION (NOT DEFINED ABOVE) | | | | | | | | PROHIBITED |

FIG.3A

| | CONTROL SIGNAL | STATE |
|---|---|---|
| P-CHANNEL | H | OFF |
| | L | ON |
| N-CHANNEL | L | OFF |
| | H | ON |

FIG.3B

CONTROL CIRCUITS FOR ELECTROCHEMICAL PUMP WITH E-VALVES

FIELD OF THE INVENTION

The present invention relates generally to driving circuits for the operation of an electrochemical pump or other actuator system that requires an applied voltage difference. Specifically, the present invention relates to a driving circuit based on an H-bridge circuit, wherein part of the H-bridge circuit is shared among actuators and controlled by a microcontroller, thereby reducing the required number of circuit elements.

BACKGROUND OF THE INVENTION

A conventional actuator is operated in response to an applied voltage potential to perform some mechanical operation such as a valve operation or a pump operation. The state of the actuator can be changed by an applied voltage and a driving current through the actuator in a forward or reverse direction. Such bi-directional current flow is necessary for normal operation. As illustrated in FIG. 1A, one such actuator can be an electrochemical pump actuator that is operated in response to an applied voltage potential.

As illustrated in FIG. 1A, an electrochemical pump-type actuator can comprise a housing containing therein at least three chambers wherein the first and second chambers contain a pumping fluid, and the third chamber contains a substance to be pumped from an outlet of the third chamber. In operation, an applied voltage +V is used to move pumping fluid from chamber one into chamber two through a selective membrane between chambers one and two, thereby exerting pressure on chamber three through expansion of the expansion diaphragm between chambers two and three. The contents of chamber three are then forced or pumped from chamber three through the exit port as indicated by the arrow in FIG. 1A. Reversal of the applied voltage potential −V is then used to reverse the movement of the pumping fluid from chamber two into chamber one, thereby creating a reduced pressure in chamber three by a reverse movement of the expansion diaphragm. Content is then drawn into chamber three and the process is repeated. Further details of an exemplary electrochemical pump can be found in U.S. Pat. No. 7,718,047; U.S. Pat. No. 8,187,441; and U.S. Pat. No. 8,343,324, the entire content of all of which are expressly incorporated herein by reference.

A number of valves are required for such pumping operations, and the operation of such valves must be coordinated with the pumping operations. For example, an intake valve can be provided to allow content from a source to enter chamber three. The intake valve can then be closed and an outlet valve opened and the pump actuated to allow the pumped content from chamber three to reach a destination. The outlet valve can then be closed and the intake valve opened and the pump deactivated to allow content from the source to enter chamber three. The intake valve can then be closed and the outlet valve again opened and the pump actuated to allow the pumped content from chamber three to reach the destination. The operation can be repeated as necessary to pump content using the electrochemical pump actuator.

The states of the valves and pump can be changed by an applied voltage and a driving current through the actuator of each in a forward or reverse direction. One such method to do so is the use of a standard H-bridge driving circuit. As shown in FIG. 1B, a standard H-bridge driving circuit can consist of two half-bridges and is used to control a single driven device D. Such a circuit allows a voltage Vin to be applied across a driven device D in either direction. The term "H-bridge" is derived from the graphical representation of such a circuit, which typically includes four switches. When the switches S1 and S4 are closed and switches S2 and S3 are open, a positive voltage can be applied across the device load D. By opening switches S1 and S4 and closing switches S2 and S3, the voltage is reversed across the device load D. Such conventional H-bridge driving circuits can be constructed as integrated circuits or can be built from discrete components.

However, in some applications, the overall design of the system is highly space and cost constrained, and any opportunity to reduce the overall number of components is helpful. Accordingly, there is a need to provide such driving circuits that perform in a manner associated with a conventional H-bridge driving circuit, but which reduce the required space and cost of the driving circuit.

SUMMARY OF THE INVENTION

An object of the present invention is to substantially address the above and other concerns, and provide advanced, improved, and novel driving circuits for the operation of an electrochemical pump or other actuator system that requires an applied voltage difference.

Another object of the present invention is to provide driving circuits for the operation of an electrochemical pump or other actuator system that requires an applied voltage difference that requires fewer components for operation, thereby reducing power consumption and overall components for failure mitigation and cost reduction.

Another object of the present invention is to provide driving circuits for the operation of an electrochemical pump or other actuator system that requires an applied voltage difference that requires fewer components for operation, thereby reducing the required space for operation.

These and other objects are substantially achieved by providing driving circuits for the operation of an electrochemical pump or other actuator system that requires an applied voltage difference, wherein only one actuator requires operation at any given time. As only one actuator requires operation at any given time, a driving circuit based on an H-bridge driving circuit can be provided and controlled by a microcontroller, wherein part of the circuit is shared among actuators, thereby reducing the required number of circuit elements.

BRIEF DESCRIPTION OF THE DRAWINGS

The various objects, advantages and novel features of the exemplary embodiments of the present invention will be more readily appreciated from the following detailed description when read in conjunction with the appended drawings, in which:

FIG. 3A is a truth table for an exemplary driving circuit of FIG. 4 in accordance with an embodiment of the present invention;

FIG. 3B is a truth table for another exemplary driving circuit in accordance with an embodiment of the present invention.

Throughout the drawings, like reference numerals will be understood to refer to like parts, components and structures.

DETAILED DESCRIPTION OF THE EXEMPLARY EMBODIMENTS

Figure 1A:
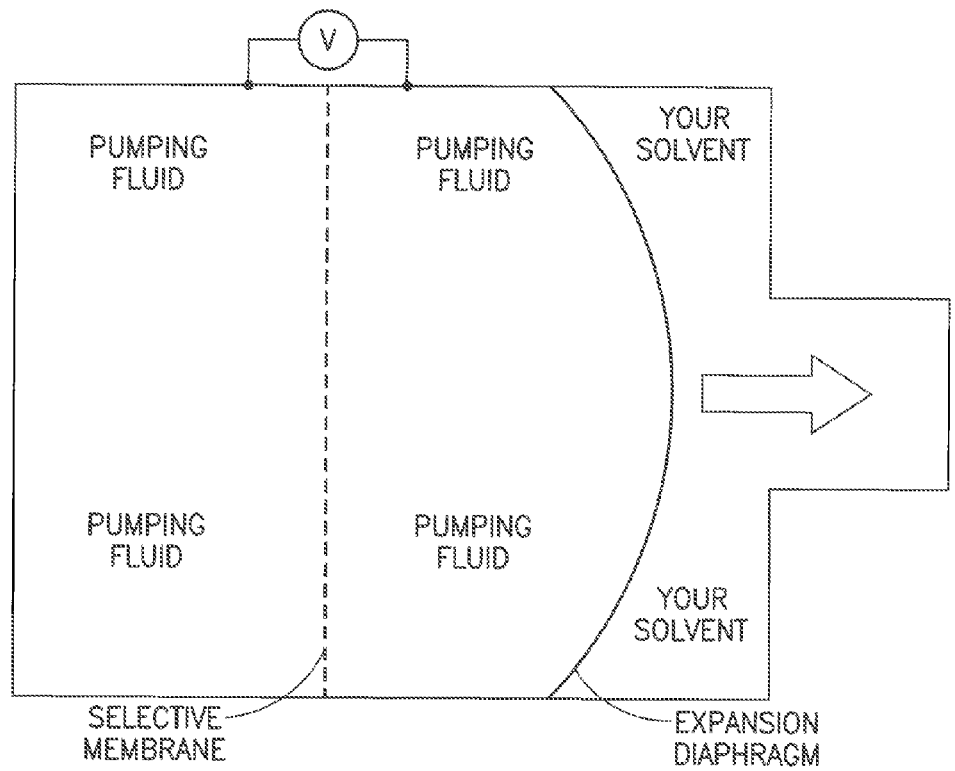
FIG. 1A is an illustrative diagram of an electrochemical pump.
Figure 1B:
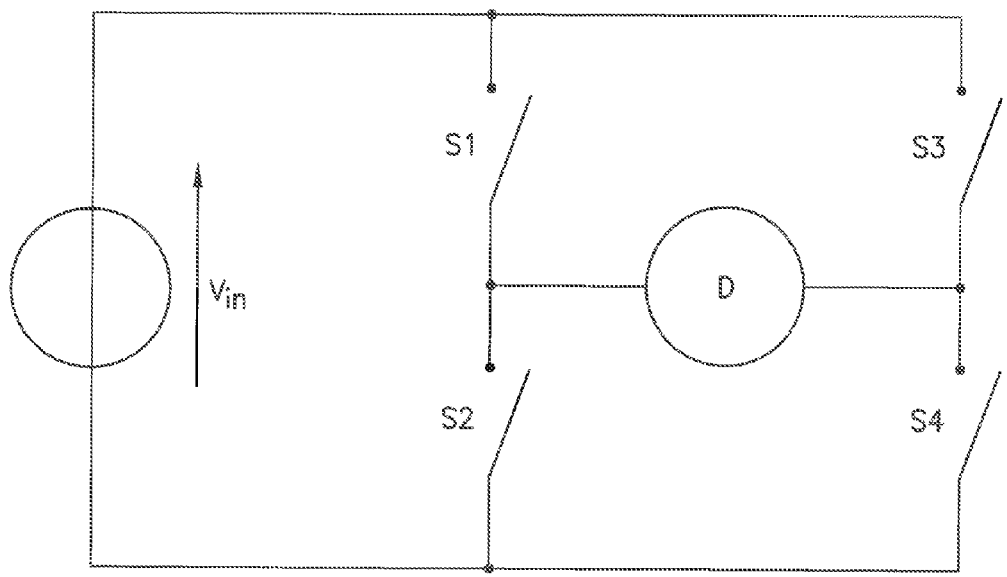
FIG. 1B is an illustrative diagram of an H-bridge driving circuit.

The exemplary embodiments of the present invention described below provide novel means of controlling the operation of an electrochemical pump or other actuator system that requires an applied voltage difference, wherein only one actuator requires operation at any given time. As only one actuator requires operation at any given time, a driving circuit based on an H-bridge driving circuit can be provided and controlled by a microcontroller, wherein part of the circuit is shared among actuators, thereby reducing the required number of circuit elements.

Embodiments of the present invention are directed to an electrochemical actuator drive system and method that provides for full control of an electrochemical pump system with fewer electronic components than a configuration where all actuator drive channels are separate. An exemplary architecture of the present invention includes three electrochemical actuators, including two valve actuators, and one pump actuator. As only one actuator requires operation at any given time, a driving circuit based on a half-bridge driving circuit can be provided and controlled by a microcontroller, wherein part of the circuit is shared among actuators. In doing so, the overall design of the system is highly space and cost efficient. Bi-directional, precision control of each electrochemical actuator can be provided to ensure each actuator is cycled fully while not damaging the actuator.

An exemplary driving circuit according to an embodiment of the present invention monitors and controls the operation the one pump actuator and two valve actuators by changing the states of each actuator when required to do so. The states of the actuators are changed by driving current through them in one direction or the other in response to the applied voltage polarity. Bi-directional electric current flow is necessary for normal operation of such actuators, and parameters of such actuators can be measured to indicate operation of the actuators.

An exemplary driving circuit according to an embodiment of the present invention has been designed to minimize the total number of electronic components needed to control the state of all three actuators. The exemplary driving circuit is based on a standard H-bridge driving circuit wherein part of the circuit is shared among actuators. Because the system only needs to operate either the pump actuator or one of the valve actuators at any given time, part of the H-bridge driving circuit can be shared among the three actuators, thereby permitting the use of four half-bridge driving circuits. Also, since only one of the pump actuator and the valve actuators are operated at any given time, a shared single current sensing circuit can be provided that can sense the current for any of the three actuators when they are being driven in either direction and used to indicate operation of the actuators. A single microcontroller can be provided to control each half-bridge driving circuit to control the operations of the valve actuators and pump actuator, and measure the state of the actuators based on the signal of the current sensing circuit.

Figure 2:
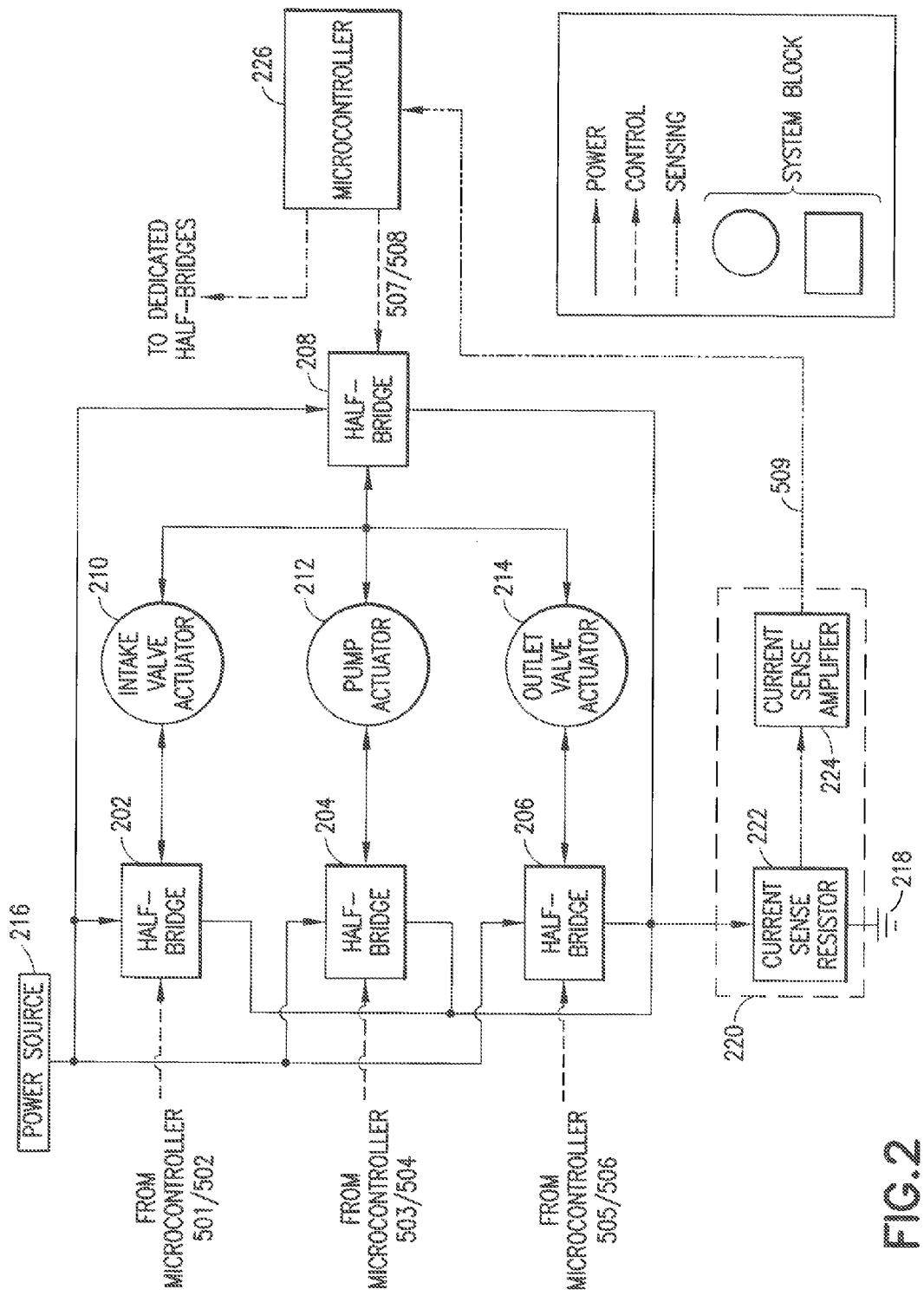
FIG. 2 is block diagram of an exemplary driving circuit for an electrochemical pump in accordance with an embodiment of the present invention.

An exemplary embodiment of a driving circuit in accordance with the present invention is shown in the block diagram of FIG. 2. The driving circuit of FIG. 2 includes three half-bridge driving circuits, one dedicated for each actuator. The circuit further includes one shared half-bridge driving circuit that is common to all actuators. As described in greater detail below, a half-bridge driving circuit is a variation of the standard H-bridge driving circuit that uses only the two switches on one side of the load. Each half-bridge driving circuit is coupled between a voltage supply and ground, and has a first and second control signal input from the microcontroller, and a single output to the respective actuator.

The driving circuit further includes a low-side current sensing circuit that is also common to all actuators. The current sensing circuit can include, for example, a current sensing resistor and amplifier that communicate a sensed current value of a driving actuator to the microcontroller. The microcontroller then calculates electric charge based upon the sensed current values to determine the state of the actuators, and controls the state of each half-bridge driving circuit appropriately to ensure proper cycling of the pump system.

Figure 4:
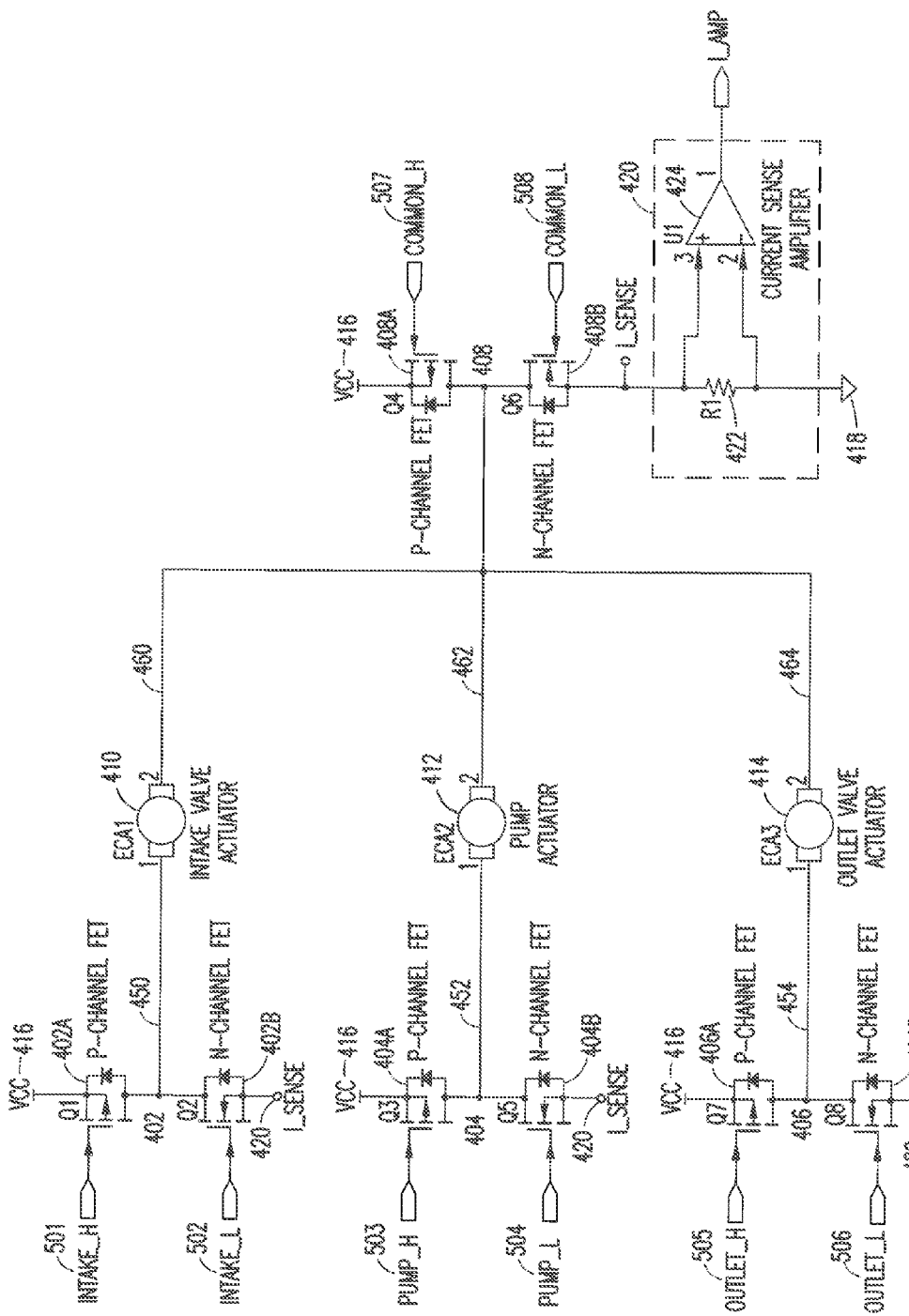
FIG. 4 is a schematic of an embodiment of the driving circuit of FIG. 2 in accordance with an embodiment of the present invention.

The block diagram of FIG. 2 comprises half-bridge driving circuits 202, 204, 206, 208. A schematic view of an exemplary half-bridge driving circuit is shown in FIG. 4. Half-bridge driving circuits 202, 204, 206 are dedicated to actuators 210, 212, 214, respectively. The half-bridge driving circuits 202, 204, 206, 208 can include any number of conventional devices, such as those manufactured by Vishay Siliconix®, Part No. Si3588DV, and can be chosen based, in part, on other system requirements since the driving circuits can include additional functionality for use in the system.

The half-bridge driving circuit 202 is dedicated to a single actuator, an intake valve actuator 210, and is coupled to a high-side power source 216 and is coupled to a low-side power source or system ground 218 via a low-side current sensing circuit 220. The half-bridge driving circuit 204 is also dedicated to a single actuator, a pump actuator 212, and is also coupled to the high-side power source 216 and is coupled to the low-side power source or system ground 218 via the low-side current sensing circuit 220. The half-bridge driving circuit 206 is still also dedicated to a single actuator, an outlet valve actuator 214, and is also coupled to the high-side power source 216 and is coupled to the low-side power source or system ground 218 via the low-side current sensing circuit 220. As only one actuator requires operation at any given time, the half-bridge driving circuit 208 can be shared among the actuators 210, 212, 214. That is, the half-bridge driving circuit 208 is shared among the actuators 210, 212, 214, and is coupled to the high-side power source 216 and is coupled to the low-side power source or system ground 218 via the low-side current sensing circuit 220. Accordingly, in doing so, only four half-bridge driving circuits 202, 204, 206, 208 are required for the control of actuators 210, 212, 214. The combined driving circuitry of FIG. 2 is possible because the exemplary pumping system requires only one actuator to be cycled at a time.

As noted, since only one of the pump actuator and the valve actuators are operated at any given time, the shared single current sensing circuit 220 can be provided that can sense the current for any of the three actuators when they are being driven in either direction and used to indicate operation and/or position of the actuators. The low-side current sensing circuit 220 that is common to all actuators 210, 212, 214, includes a current sensing resistor 222 and amplifier 224 that communicates a low-side sensed current value to the microcontroller 226. The microcontroller 226 then calculates electric charge based upon the sensed current values to determine the state of the actuators 210, 212, 214, and controls the state of each half-bridge driving circuit 202, 204, 206, 208, through a first and second control signal input to each driving circuit to ensure proper cycling of the pump system.

The low-sides of all of the half-bridge driving circuits 202, 204, 206, 208 are connected to the low-side power source or system ground 218 through the common low-side current sensing circuit 220. When an actuator is being driven, this circuit 220 measures the current flowing through the active actuator. The current sensing resistor 222 is used to produce a voltage that is proportional to the current flowing through it. This voltage is then amplified using an amplifier 224 such as by using a ground-referenced operational amplifier circuit 424 as shown in FIG. 4. The output of the operational amplifier 224, 424 is communicated to the microcontroller 226 where, for example, the output can be converted to a digital quantity by an analog-to-digital converter in the microcontroller and used to indicate operation, malfunction, and/or position of the actuator being driven. Accordingly, the microcontroller can be provided to control each of the half-bridge driving circuits 202, 204, 206, 208 such that actuators 210, 212, 214 can operate at the proper time and based upon the measured operation, malfunction, and/or position of the actuator being driven by the signal of the current sensing circuit 220. The microcontroller 226 can include any number of conventional devices such as 8-bit, 16-bit and 32-bit microcontrollers available from Intel®, National Semiconductor® and Cypress Semiconductor®, and can be chosen based, in part, on other system requirements since the microcontroller can include additional functionality for use in the system.

As noted, when an actuator 210, 212, 214 is being driven, the current sensing circuit 220 measures the current flowing through the driven actuator, and provides an output based thereon to the microcontroller 226 where the output can be converted to a digital quantity by an analog-to-digital converter therein and used to calculate electric charge. For example, the total electric charge transferred through each electrochemical actuator is counted by measuring current flowing through the driven actuator and performing an integration of the current over time. The microcontroller performs the integration on the current over time to calculate the total electric charge transferred through the actuator during the actuator state change, thereby indicating operation, malfunction, and/or position of the actuator being driven. To do so, the microcontroller 226 can employ a current integrator, which is an electronic device performing a time integration of an electric current to measure a total electric charge.

For example, the total electric charge transferred through the actuator during the actuator state change can be used to determine the position of the actuator. An algorithm can be used to determine, for example, when the driven actuator has reached its end-of-travel based on the measured charge. Certain error states can also be detected by monitoring the current and total electric charge transferred through the actuator during the actuator state change. Further, data from previous actuations can also be used to improve the detection of errors.

One example of an integration calculation showing a derived actuator position includes a study of power dissipated by the actuator, which can be translated into position (in the case of the valve actuators) and volume transferred by the actuator (in the case of the pump actuator). Based upon the low-side sensed current value of a specific actuator 210, 212, 214 as measured by the current sensing resistor 222 and amplifier 224, the microcontroller 226 can first calculate a Riemann sum to estimate the total charge consumed. This method is a well-known method for approximating an integral calculation. The following is a simple example of one possible calculation.

In an exemplary operation to measure the volume transferred by the pump actuator 212, 412, the microcontroller 226 reads current data at a rate of one point every 100 milliseconds. Further, in the exemplary operation, the pump actuator 212, 412 is driven for 1 second. Each data point is captured at the midpoint of each of the 10 intervals. The 10 data points taken over this time are:

{100 mA,100 mA,200 mA,200 mA,100 mA,100 mA,200 mA,200 mA,100 mA,100 mA}

The total charge for each segment is calculated as the measured current multiplied by the time-step. The total charge is the sum of the segments as shown by Equation (1) below, which is factored for clarity.

$$100 \text{ ms}*(100 \text{ mA}+100 \text{ mA}+200 \text{ mA}+200 \text{ mA}+100 \text{ mA}+100 \text{ mA}+200 \text{ mA}+200 \text{ mA}+100 \text{ mA}+100 \text{ mA})=140 \text{ mC of total charge} \quad (1)$$

The position of the pump actuator 212, 412 moves by a fixed volume for every unit of charge. If, in the exemplary operation, the pump actuator 212, 412 displaces 1 mL/C, the content volume transferred by the actuator is shown by Equation (2) below:

$$140 \text{ mC}*1 \text{ mL/C}=140 \text{ μL} \quad (2)$$

The pump actuator 212, 412 requires a known amount of volume transfer to change states. If, in the exemplary operation, the state change volume was known to be 140 μL, the pump actuator 212, 412 would have changed states. In most applications, the sampling rate of the current measurement data is significantly faster. The 100 ms value above was chosen for illustrative simplicity, and round numbers were also chosen to represent the current values for the same reason.

As noted, a half-bridge driving circuit is variation of the standard H-bridge driving circuit that uses just the two switches on one side of the load. Each half-bridge driving circuit is coupled between a voltage supply and ground, and has a first and second control signal input from the microcontroller 226, and a single output to the respective actuator 210, 212, 214. The half-bridge driving circuit can be provided in a number of ways, including as a configuration of transistors that allows a common electrical node to be connected to one of two electrical potentials as controlled by external signals. In the example of FIG. 2, the implementation of the half-bridge driving circuits 202, 204, 206, 208 can be varied to allow operation of the driving circuit in a system powered from a single low voltage 216, such as a 1.5V battery. Such implementation of the half-bridge driving circuits 202, 204, 206, 208 includes the use of metal-oxide-semiconductor field-effect transistors (MOSFETs), p-channel field-effect transistors (PFETs), n-channel field-effect transistors (NFETs) and combinations thereof available from Vishay®, Texas Instruments® and NXP®, and can be chosen based, in part, on other system requirements since the transistors can include additional functionality for use in the system.

In a first exemplary implementation of the present invention shown in FIG. 4, the half-bridge driving circuits 202, 204, 206, 208 of FIG. 2 can comprise a p-channel field-effect transistor (PFET) on the top or voltage supply side, and an n-channel field-effect transistor (NFET) on the bottom or system ground side via the low-side current sensing circuit 420, but embodiments are not limited thereto. This configuration can be used if, the power source or voltage supply 416 minus the microcontroller (μC) 226 low voltage drive, is higher than the maximum FET gate threshold.

In the first exemplary implementation of the present invention shown in FIG. 4, each of the half-bridge driving circuits 202, 204, 206, 208 comprises a p-channel field-effect transistor (PFET) 402A, 404A, 406A, 408A having the source lead coupled to the power source or voltage supply 416, the drain lead coupled to the respective actuators 410, 412, 414, and the gate lead 501, 503, 505, 507 coupled to the microcontroller 226 for controlling the PFET operation. Further, each of the half-bridge driving circuits comprise an n-channel field-effect transistor (NFET) 402B, 404B, 406B, 408B having the source lead coupled to the system ground 418 via the low-side current sensing circuit 420, the drain lead coupled to the respective actuators 410, 412, 414, and the gate lead 502, 504, 506, 508 coupled to the microcontroller 226 for controlling the NFET operation. As illustrated in FIG. 4, PFET 402A and NFET 402B are dedicated to a single actuator 410. PFET 404A and NFET 404B are also dedicated to a single actuator 412, and PFET 406A and NFET 406B are also dedicated to a single actuator 414, wherein the actuators 410, 412 and 414 can comprise intake valve actuators, outlet valve actuators and pump actuators as described above in connection with FIG. 2 and elements 210, 212, 214. PFET 408A and NFET 408B, and the low-side current sensing circuit 420, are shared among actuators 410, 412, 414. The microcontroller 226 calculates electric charge based upon the sensed current value of lead 509 to determine the state of the actuators.

In a second exemplary implementation of the present invention (not shown), each of the half-bridge driving circuits 202, 204, 206, 208 can comprise an NFET on both the top or voltage supply side, and on the bottom or system ground side via the low-side current sensing circuit, wherein the remaining connections are the same as described above in regard to the first implementation. This configuration can be used if, for example, the microcontroller (S±C) high voltage drive minus the power source or voltage supply is higher than the maximum FET gate threshold.

In both the first and second exemplary implementations, the microcontroller (μC) high voltage drive must also be higher than the maximum FET gate threshold to turn on the low side NFET. Other implementations of the half-bridge driving circuits can use bipolar transistors, switches or similar devices, or combinations of such devices.

In an exemplary operation of the driving circuit of FIG. 4, one terminal 450, 452, 454 of each of the three two-terminal actuators 410, 412, 414, respectively, is connected to the dedicated half-bridge driving circuits 402, 404, 406. The other terminals 460, 462, 464 of the actuators 410, 412, 414, respectively, are connected together and connected the common half-bridge driving circuit 408. All of the half-bridge driving circuits 402, 404, 406, 408 are configured to switch their output or drain connections between the battery voltage/voltage supply 416 and system ground 418 (via the low-side current sensing circuit 420). A respective actuator is controlled by the microcontroller 226 by turning on both its dedicated half-bridge driving circuit and the common or shared half-bridge driving circuit appropriately. The microcontroller 226 ensures that only one actuator is active at any given time. As such, the measurement by the low-side current sensing circuit 420 is limited to the only one actuator active at any given time. FIG. 3A is a truth table for the exemplary driving circuit of FIG. 4 in accordance with an embodiment of the present invention.

As noted above, the microcontroller 226 is used to direct the control of each half-bridge driving circuit 402, 404, 406, 408 as illustrated in the truth table of FIG. 3A. A respective actuator is controlled with the microcontroller by turning on both its dedicated half-bridge driving circuit and the common or shared half-bridge driving circuit appropriately. The microcontroller 226 ensures that only one actuator is active at any given time.

In the exemplary system shown, the actuators 410, 412, 414 consist of an electrochemical pump and an intake valve to allow content from a source to enter the pump and an outlet valve to allow content to exit the pump. The intake valve can be closed and the outlet valve opened and the pump actuated to allow the pumped content. The outlet valve can then be closed and the intake valve opened and the pump deactivated to allow content from a source to enter. The intake valve can then be closed and the outlet valve again opened and the pump actuated to allow the pumped content. The operation can be repeated to pump a content using the electrochemical pump actuator.

As shown in FIG. 3A, a number of possible intake valve, outlet valve and pump actuator states are shown in the rightmost column, including an "idle" state, an "open intake valve" state, a "close intake valve" state, a "pump intake" state, a "pump output" state, an "open outlet valve" state, a "close outlet valve" state and a "prohibited" state. A "prohibited" state indicates that the control signal states are not valid, and is not a defined state of normal operation. A control signal 501-508 state is shown in columns 1-8 for each of the possible actuator states. The control signal state shown in columns 1-8 corresponds to the gate inputs 501-508 of FETs 402A, 402B, 404A, 404B, 406A, 406B, 408A, 408B, respectively. The microcontroller 226 is prohibited from using any combinations that are not explicitly defined in the entries in the table of FIG. 3A. For purposes of discussion, actuator 410 is an intake valve actuator, actuator 412 is a pump actuator, and actuator 414 is an outlet valve actuator.

As noted above, the microcontroller 226 calculates electric charge based upon the sensed current values to determine the state of the actuators and controls the state of each half-bridge driving circuit through a first and second control signal input to each driving circuit to ensure proper cycling of the pump system. In the table of FIG. 3A, the microcontroller 226 is configured to output a low signal (L) sufficient to turn OFF the FET, or output a high signal (H) sufficient to turn ON the FET using the gate inputs 501-508. The table in FIG. 3A is for an embodiment that uses P-channel FETs on the upper parts of the half-bridges (e.g., coupled to power supply) and N-channel FETs on the lower parts of the half-bridges (e.g., coupled to sensing circuit).

In an idle state (row 1 of the table in FIG. 3A), all of FETs 402A, 404A, 406A, 408A are OFF due to high signals of columns 1, 3, 5, 7. All of FETs 402B, 404B, 406B, 408B are OFF due to low signals of columns 2, 4, 6, 8, of row 1. There is no ground and no power connected to any actuator in the idle state, therefore no actuator can operate.

In an open intake valve state (row 2 of the table in FIG. 3A), FET 402A and FET 408B are ON, due to a low signal of column 1 switching FET 402A ON, and a high signal of column 8 switching FET 408B ON. The remaining FETs are unchanged from the idle state. In this case, the intake valve actuator 410 is connected to the power and ground in a polarity to open the intake valve.

In a close intake valve state (row 3 of the table in FIG. 3A), FET 402B and FET 408A are ON, due to a low signal of column 2 switching FET 402B ON, and a low signal of column 7 switching FET 408A ON. The remaining FETs are unchanged from the idle state. In this case, the intake valve actuator 410 is connected to the power and ground in a polarity to close the intake valve.

In a pump intake state (row 4 of the table of FIG. 3A), FET 404A and FET 408B are ON, due to a low signal of column 3 switching FET 404A ON, and a high signal of column 8 switching FET 408B ON. The remaining FETs are unchanged from the idle state. In this case, the pump actuator 412 is connected to the power and ground in a polarity to operate the pump for intake.

In a pump output state (row 5 of the table of FIG. 3A), FET 404B and FET 408A are ON, due to a low signal of column 4 switching FET 404B ON, and a low signal of column 7 switching FET 408A ON. The remaining FETs are unchanged from the idle state. In this case, the pump actuator 412 is connected to the power and ground in a polarity to operate the pump for output.

In an open outlet valve state (row 6 of the table of FIG. 3A), FET 406A and FET 408B are ON, due to a low signal of column 5 switching FET 406A ON, and a high signal of column 8 switching FET 408B ON. The remaining FETs are unchanged from the idle state. In this case, the outlet valve actuator 414 is connected to the power and ground in a polarity to open the outlet valve.

In a closed outlet state (row 7 of the table of FIG. 3A), FET 406B and FET 408A are ON, due to a low signal of column 6 switching FET 406B ON, and a low signal of column 7 switching FET 408A ON. The remaining FETs are unchanged from the idle state. In this case, the outlet valve actuator 414 is connected to the power and ground in a polarity to close the outlet valve.

In each state described above, the single actuator being driven can be monitored by the microcontroller 226 via the low-side current sensing circuit 420 as described above. In response thereto, the microcontroller 226 can operate the system in the following exemplary manner. If the valves are all started from an initial closed state and the pump starts fully expelled, the microcontroller 226 first opens the intake valve. FET 402A and FET 408B are ON, due to a low signal input 501 from the microcontroller 226 switching FET 402A ON, and a high signal input 508 from the microcontroller 226 switching FET 408B ON. The intake valve actuator 410 is connected to the power 416 and ground 418 in a polarity to open the intake valve The opening of the intake valve operation can be monitored by the microcontroller 226 via the low-side current sensing circuit 420 as described above. In response thereto, the microcontroller 226 then operates the pump intake. FET 404A and FET 408B are ON, due to a low signal input 503 from the microcontroller 226 switching FET 404A ON, and a high signal input 508 from the microcontroller 226 switching FET 408B ON. The pump actuator 412 is connected to the power 416 and ground 418 in a polarity to operate the pump for intake.

The pump intake operation can be monitored by the microcontroller 226 via the low-side current sensing circuit 420 as described above. In response thereto, the microcontroller 226 then closes the intake valve. FET 402B and FET 408A are ON, due to a low signal input 502 from the microcontroller 226 switching FET 402B ON, and a low signal input 507 from the microcontroller 226 switching FET 408A ON. The intake valve actuator 410 is connected to the power 416 and ground 418 in a polarity to close the intake valve.

The closing of the intake valve operation can be monitored by the microcontroller 226 via the low-side current sensing circuit 420 as described above. In response thereto, the microcontroller 226 then opens the output valve. FET 406A and FET 408B are ON, due to a low signal input 505 from the microcontroller 226 switching FET 406A ON, and a high signal input 508 from the microcontroller 226 switching FET 408B ON. The outlet valve actuator 414 is connected to the power 416 and ground 418 in a polarity to open the outlet valve.

The opening of the outlet valve operation can be monitored by the microcontroller 226 via the low-side current sensing circuit 420 as described above. In response thereto, the microcontroller 226 then operates the pump output. FET 404B and FET 408A are ON, due to a low signal input 504 from the microcontroller 226 switching FET 404B ON, and a low signal input 507 from the microcontroller 226 switching FET 408A ON. The pump actuator 412 is connected to the power 416 and ground 418 in a polarity to operate the pump for output.

The pump output operation can be monitored by the microcontroller 226 via the low-side current sensing circuit 420 as described above. In response thereto, the microcontroller 226 then closes the output valve. FET 406B and FET 408A are ON, due to a low signal input 506 from the microcontroller 226 switching FET 406B ON, and a low signal input 507 from the microcontroller 226 switching FET 408A ON. The outlet valve actuator 414 is connected to the power 416 and ground 418 in a polarity to close the outlet valve. The procedure can them be repeated as necessary, with a cumulative delivery content being monitored by the microcontroller 226.

As noted above, the pump can be comprised of an electrochemical pump-type actuator having a housing containing therein at least three chambers wherein the first and second chambers contain a pumping fluid, and the third chamber contains a substance to be pumped from an outlet of the third chamber. In operation, an applied voltage +V is used to move pumping fluid from chamber one into chamber two through a selective membrane between chambers one and two, thereby exerting pressure on chamber three through expansion of the expansion diaphragm between chambers two and three. The contents of chamber three are then forced or pumped from chamber three through the exit port. Reversal of the applied voltage potential −V is then used to reverse the movement of the pumping fluid from chamber two into chamber one, thereby creating a reduced pressure in chamber three by a reverse movement of the expansion diaphragm. Content is then drawn into chamber three and the process is repeated.

The ordered description above is presented to facilitate understanding of the truth table of FIG. 3A. Actual operation of the driving circuit can vary from the signal order presented above. For example, the truth table of FIG. 3B illustrates how the control logic operates for different types of FETS. For a P-Channel FET, a high control signal (H) by the microcontroller 226 can be used to turn OFF the P-Channel FET, and a low control signal (L) can be used to turn ON the P-Channel FET. For an N-Channel FET, a high control signal (H) by the microcontroller 226 can be used to turn ON the P-Channel FET, and a low control signal (L) can be used to turn OFF the P-Channel FET.

Further, as shown in row 8 of the truth table of FIG. 3A, any other combination of low and high signals from the microcontroller 226 is prohibited. For example, some unlisted combinations could result in multiple actuators to be active at the same time. In these cases, the actual location of each actuator cannot be determined and may lead to damage to one or more of the actuators. Further, some unlisted combinations could result in a direct short circuit between power and ground in the drive circuit which can damage the circuit itself or other components.

Further, although only three actuators are shown in the exemplary embodiments, the present invention can be extended to operate any plurality of actuators. Further, the current sensing circuit 220, 420 can be located on the high-side of the driving circuit, such as between the source of FETs 402, 404, 406, 408 and the voltage supply 416. The current sensing circuit can also consist of a plurality of current sensing circuits with, for example, one located in-line with each actuator.

An advantage of the present invention is that the total number of active components is minimized to achieve the lowest possible cost. By providing a half-bridge driving circuit on one side of the circuit, and providing three individual half-bridge driving circuits on the other side of the circuit, and a common current sensing circuit located on the low-side of the driving circuit, there are fewer components which require less physical space, allow for reduced cost, and retain full current sensing.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of the appended claims and their equivalents.

What is claimed is:

1. An actuator drive system, comprising:
   a pump actuator;
   a plurality of valve actuators;
   a dedicated half-bridge driving circuit for each of said pump actuator and plurality of valve actuators; and
   a common half-bridge driving circuit for all of said pump actuator and plurality of valve actuators,
   wherein said common half-bridge driving circuit for all of said pump actuator and plurality of valve actuators operates to drive one of said pump actuator and plurality of valve actuators in cooperation with said dedicated half-bridge driving circuits for each of said pump actuator and plurality of valve actuators.

2. An actuator drive system as claimed in claim 1, further comprising:
   a common current sensing circuit for all of said pump actuator and plurality of valve actuators,
   wherein said common current sensing circuit senses a current of a driven one of said pump actuator and valve actuators.

3. An actuator drive system as claimed in claim 2, wherein:
   said common current sensing circuit is electrically coupled between each of said dedicated half-bridge driving circuits and a system ground; and
   said common current sensing circuit is electrically coupled between said common half-bridge driving circuit and said system ground.

4. An actuator drive system as claimed in claim 2, further comprising:
   a microcontroller electrically coupled to said current sensing circuit and each of said half-bridge driving circuits to selectively control said half-bridge driving circuits to drive one of said pump actuator and valve actuators, and
   said microcontroller is configured to determine a volume transferred by said pump actuator in response to a current sensing circuit output.

5. An actuator drive system as claimed in claim 1, wherein said pump actuator is electrically coupled between a first dedicated half-bridge driving circuit and said common half-bridge driving circuit.

6. An actuator drive system as claimed in claim 5, wherein:
   said first dedicated half-bridge driving circuit and said common half-bridge driving circuit are configured to selectively switch a voltage supply and a system ground to said pump actuator.

7. An actuator drive system as claimed in claim 1, wherein one of said plurality of valve actuators is electrically coupled between a second dedicated half-bridge driving circuit and said common half-bridge driving circuit.

8. An actuator drive system as claimed in claim 7, wherein:
   said second dedicated half-bridge driving circuit and said common half-bridge driving circuit are configured to selectively switch a voltage supply and a system ground to said valve actuator.

9. An actuator drive system as claimed in claim 1, wherein one of said plurality of valve actuators is electrically coupled between a third dedicated half-bridge driving circuit and said common half-bridge driving circuit.

10. An actuator drive system as claimed in claim 9, wherein:
    said third dedicated half-bridge driving circuit and said common half-bridge driving circuit are configured to selectively switch a voltage supply and a system ground to said valve actuator.

11. An actuator drive system as claimed in claim 1, wherein each said half-bridge driving circuit comprises a p-channel field-effect transistor (PFET) and an n-channel field-effect transistor (NFET).

12. An actuator drive system as claimed in claim 1, wherein each said half-bridge driving circuit comprises a first and second n-channel field-effect transistor (NFET).

13. An actuator drive system as claimed in claim 1, wherein said pump actuator comprises an electrochemical pump-type actuator.

14. An actuator drive system, comprising:
    a plurality of actuators;
    a dedicated half-bridge driving circuit for each of said actuators; and
    a common half-bridge driving circuit for all of said actuators,
    wherein said common half-bridge driving circuit for all of said actuators operates to drive one of said actuators in cooperation with said dedicated half-bridge driving circuits for each of said actuators.

15. An actuator drive system as claimed in claim 14, further comprising:
    a common current sensing circuit for all of said actuators,
    wherein said common current sensing circuit senses a current of a driven actuator.

16. An actuator drive system as claimed in claim 15, wherein:
    said common current sensing circuit is electrically coupled between each of said dedicated half-bridge driving circuits and a system ground; and
    said common current sensing circuit is electrically coupled between said common half-bridge driving circuit and said system ground.

17. An actuator drive system as claimed in claim 15, further comprising:
    a microcontroller electrically coupled to said current sensing circuit and each of said half-bridge driving circuits to selectively control said half-bridge driving circuits to drive one of said plurality of actuators, and
    said microcontroller is configured to determine a volume transferred by said drive system in response to a current sensing circuit output.

18. An actuator drive system as claimed in claim 14,
    wherein each one of said plurality of actuators is electrically coupled between a single dedicated half-bridge driving circuit and said common half-bridge driving circuit, and
    wherein each one of said plurality of dedicated half-bridge driving circuits is electrically coupled to a single actuator of said plurality of actuators.

19. An actuator drive system as claimed in claim 18, wherein:
said first dedicated half-bridge driving circuit and said common half-bridge driving circuit are configured to selectively switch a voltage supply and a system ground to said actuator.

20. An actuator drive system as claimed in claim 14, wherein each said half-bridge driving circuit comprises a p-channel field-effect transistor (PFET) and an n-channel field-effect transistor (NFET).

21. An actuator drive system as claimed in claim 14, wherein each said half-bridge driving circuit comprises a first and second n-channel field-effect transistor (NFET).

22. A method of controlling an actuator drive system, comprising a pump actuator and a plurality of valve actuators, the method comprising:
controlling a dedicated half-bridge driving circuit for each of said pump actuator and plurality of valve actuators; and
controlling a common half-bridge driving circuit for all of said pump actuator and plurality of valve actuators,
wherein said common half-bridge driving circuit for all of said pump actuator and plurality of valve actuators is controlled to drive one of said pump actuator and plurality of valve actuators in cooperation with said dedicated half-bridge driving circuits for each of said pump actuator and plurality of valve actuators.

23. A method of controlling an actuator drive system as claimed in claim 22, further comprising:
controlling each actuator using said common half-bridge driving circuit and one dedicated half-bridge driving circuit.

24. A method of controlling an actuator drive system as claimed in claim 22, further comprising:
controlling a common current sensing circuit for all of said pump actuator and plurality of valve actuators to sense a current of a driven one of the pump actuator and valve actuators.

25. A method of controlling an actuator drive system as claimed in claim 24, further comprising:
controlling a microcontroller electrically coupled to said common current sensing circuit and each of said half-bridge driving circuits to selectively control said half-bridge driving circuits to drive one of said pump actuator and valve actuators, and
said microcontroller is configured to determine a volume transferred by said pump actuator in response to a common current sensing circuit output.

* * * * *